United States Patent
Schnaibel et al.

[15] 3,696,270
[45] Oct. 3, 1972

[54] ARRANGEMENT FOR PREVENTING THE SKIDDING OF WHEELS OF A MOTOR VEHICLE

[72] Inventors: Eberhard Schnaibel; Helmut Fleischer; Richard Zechnall, all of Stuttgart; Helmut Domann, Leonberg; Wolfgang Maisch, Schwieberdingen; Klaus Christ, Stuttgart, all of Germany

[73] Assignee: Robert Bosch GmbH, Stuttgart, Germany

[22] Filed: July 6, 1970

[21] Appl. No.: 52,171

[30] Foreign Application Priority Data

July 31, 1969 Germany..........P 19 38 977.6

[52] U.S. Cl. ..................317/5, 180/82, 303/21 CG, 180/105 E
[51] Int. Cl. ...................................................B60t 8/08
[58] Field of Search .........303/21; 180/105, 1; 317/5; 340/262, 263

[56] References Cited

UNITED STATES PATENTS

| | | | |
|---|---|---|---|
| 3,522,973 | 8/1970 | Klein et al. | 303/21 |
| 3,184,606 | 5/1965 | Ovenden et al. | 303/21 |
| 3,572,848 | 3/1971 | Marouby | 303/21 |
| 3,494,671 | 2/1970 | Slavin et al. | 303/21 |
| 3,499,689 | 3/1970 | Carp et al. | 303/21 |
| 3,558,197 | 1/1971 | Lueck et al. | 303/21 |

*Primary Examiner*—Kenneth H. Betts
*Attorney*—Michael S. Striker

[57] ABSTRACT

Each wheel has a pulse generator which furnishes a pulse sequence having a repetition rate depending upon wheel speed. The pulses set a monostable multivibrator, whose output, after low pass filtering and differentiating causes the furnishing of an output signal indicative of skidding when the rate of change of the repetition rate exceeds a predetermined rate of change.

19 Claims, 8 Drawing Figures

PATENTED OCT 3 1972

INVENTORS
Eberhard SCHNAIBEL
Helmut FLEISCHER
Richard ZECHNALL
Helmut DOMANN
Wolfgang MAISCH
Klaus CHRIST BY
Michael S. Striker
their ATTORNEY INVENTORS
Eberhard SCHNAIBEL
Helmut FLEISCHER
Richard ZECHNALL
Helmut DOMANN
Wolfgang MAISCH
Klaus CHRIST BY Michael S. Striker
their ATTORNEY INVENTORS
Eberhard SCHNAIBEL
Helmut FLEISCHER
Richard ZECHNALL
Helmut DOMANN
Wolfgang MAISCH
Klaus CHRIST BY
Michael S. Striker
their ATTORNEY

ARRANGEMENT FOR PREVENTING THE SKIDDING OF WHEELS OF A MOTOR VEHICLE

BACKGROUND OF THE INVENTION

This invention relates to an arrangement for generating an output signal indicative of skidding of wheels of a motor vehicle. In particular, it relates to such arrangements wherein the wheels of the motor vehicle have associated therewith signal generating means which furnish signals whose repetition rate is a function of a rotational speed of the wheel. Connected with the signal generating means are logic circuit means which furnish the output signal indicative of skidding when the rate of change of repetition rate of the signal sequence exceeds a predetermined or permissible rate of change. This invention relates to an arrangement wherein excessive wheel skidding may be detected substantially without delay.

When brakes are applied to a moving motor vehicle, care must be taken that the wheels are not blocked so that they slide rather than rotate along the path. The coefficient of friction between a sliding wheel and the surface on which it is moving is substantially lower than the coefficient of friction between a rolling wheel and the surface upon which it is moving. A wheel will always be blocked when the force to be transmitted from the wheel to the road surface which is generated through the pressure between the brake shoe and the drum or disc exceeds the maximum possible static friction force which is proportional to the coefficient of friction between the wheel and the surface and the loading upon the wheel. A blocking of the wheel should of course be prevented for reasons of safety since the whole vehicle may otherwise be subject to skidding.

When the brakes are applied to a vehicle moving along a straight path, the deceleration of the vehicles causes the rear wheels to be unloaded while the load is transferred to the front wheels. Therefore, to prevent blocking of the rear wheels, the brake force applied to the rear wheels must be less than the brake force applied to the front wheels.

The above-mentioned problems which appear during a braking of a vehicle can also appear when driving force is applied to the wheels of the vehicle. For vehicles moving directly on the road surface, sliding of the drive wheels can start a skidding of the vehicle, while the same process in a vehicle moving along tracks can cause unnecessary time delays during acceleration of such vehicle.

Systems are known which control the application of brakes to the wheels in dependence on excessive decelerations in the turning of the wheel. Such an excessive deceleration in rotational speed of the wheel is indicative of the beginning of a skidding process. Further, electrical signal generators are known in which the relative movement between a flywheel mass and the drive shaft of the wheel causes the closing of a contact under conditions of excessive acceleration or deceleration.

These known arrangements have the disadvantage that the element which measures excessive acceleration or deceleration has contacts which are subject to wear. Further, these arrangements have time constants associated therewith which do not allow the beginning of a skidding process to become immediately effective in controlling the braking or the driving power applied to the wheels.

SUMMARY OF THE INVENTION

It is an object of this invention to furnish an arrangement for generating an output signal in the event of a probable skidding of a motor vehicle. It is a further object of this invention that such an arrangement work without contacts which are subject to wear and substantially without time delay.

This invention is an arrangement for furnishing an output signal in the event of a probable skidding of the motor vehicle. It comprises signal generating means operatively associated with at least one wheel of the vehicle. These signal generating means furnish a signal sequence wherein the time interval between sequential signals corresponds to the rotational velocity of said wheel. Logic circuit means are operatively associated with said signal generating means. The logic circuit means furnish an output signal when the change in said time interval exceeds a predetermined change depending upon the rotational velocity of said wheel. The logic circuit means comprise a first multivibrator and a low pass filter connected to the output of said multivibrator.

The arrangement in accordance with the present invention is particularly effective, when a differentiating stage is connected to the output of the low pass filter. The differentiating stage may for example comprise an operational amplifier which has an input capacitor and a feedback resistance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
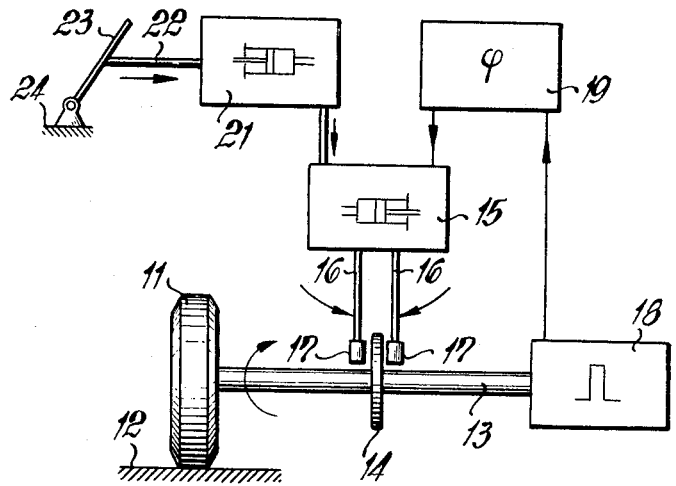
FIG. 1 shows a motor vehicle equipped with an arrangement in accordance with this invention.

A preferred embodiment of the present invention will now be described with reference to the drawing.

FIG. 1 shows a wheel of a vehicle, numbered 11, which rolls on the surface of a street, 12. The wheel 11 is connected to the axle 13. Mounted on axle 13 is a brake disc 14. A brake cylinder arrangement 15 is operatively connected with disc 14 by means of a linkage 16 on which are mounted the brake shoes 17. The signal generating means are denoted by symbol 18 and have a mechanical input connected to the axle 13. Logic circuit means 19 are connected with an electrical output of signal generating means 18. The output of the logic circuit means is connected with a first input of the brake cylinder arrangement 15. A second input of said brake cylinder arrangement 15 is connected to the output of brake control means 21. Brake control means 21 may for example comprise a pressure cylinder. In this case the connection between the brake control means 21 and the brake cylinder arrangement 15 may be a hose which conducts the pressure fluid. The brake control arrangement 21 is connected to the brake pedal 23, for example by means of an additional linkage. The brake pedal 23 is connected with the chassis of the motor vehicle and is movable relative to said chassis.

If the driver of the vehicle which contains the arrangement described in FIG. 1 desires to apply the brake, he depresses pedal 23. The brake pedal movement is transmitted via linkage 22 and the brake control arrangement 21 to the wheels of the vehicle. Specifically, brake power is applied to disc 14 via brake cylinder arrangement 15, linkage 16 and brake shoes 17. The wheel 11 is therefore decelerated via axle 13. Wheel 11 may block if the brakes are applied too rapidly. The wheel will then cease rolling along surface 12 and will instead slide. This sliding may cause the vehicle to skid. Signal generating means 18 which may for example be pulse generating means now generates pulses, the interval between pulses depending upon the rotational velocity of the wheel 11. If the rate of change of this time interval exceeds a predetermined rate of change, logic circuit means 19 furnish an output signal to brake signal arrangements 15 which causes a decrease in the power transmitted from brake shoes 17 to brake disc 14.

Figure 2:
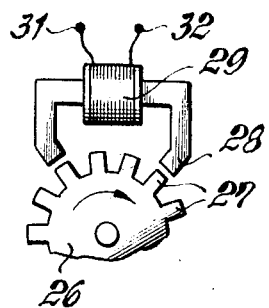
FIG. 2 shows one embodiment of signal generating means.

FIG. 2 shows one embodiment of signal generating means for use in the arrangement of this invention. A wheel 26 is connected to axle 13. This wheel is constructed of ferromagnetic material and has a number of projections along its circumference, as for example teeth 27. A yoke 28 extends around a part of the circumference of the wheel. This yoke may for example be substantially U-shaped and may have legs each of which is positioned either opposite a tooth 27 or opposite gap between said teeth. A magnetizing current flows through a coil 29 mounted on yoke 28. The inductivity of coil 29 varies in accordance with the position of wheel 26, that is, in dependence upon whether or not the magnetic circuit is closed via yoke 28, teeth 27 and wheel 26 or whether the air gap is relatively large because of the space between the teeth. As the wheel 26 turns under yoke 28, the inductivity of coil 29 varies thereby inducing an alternating current in coil 29. The so generated alternating current components are available at terminals 31 and 32 in FIG. 2. Of course, other pulse generating means may be used. For example wheel 26 may have a number of magnets 27 of alternating polarity affixed to its circumference. Magnets 27 may be mounted on a wheel made of any type of mechanically suited material. Alternatively, wheel 26 may be made of magnetic material and magnets are induced along the circumference. A yoke 28 again extends over magnets 27 in this case in such a manner that when one leg of the yoke is opposite a magnet of a given polarity the second leg is opposite a magnet of the opposite polarity. An air gap exists between the legs of yoke 28 and the magnets. A coil 29 is mounted on yoke 28. If wheel 26 now turns under yoke 28, alternatingly positive and negative voltage pulses may be derived from terminals 31 and 32. The repetition rate of the pulses will increase with increasing rotational speed of wheel 26.

An alternative embodiment of pulse generating (signal generating) means may be optical means. The path of light from a light source to a photoelectric element may be periodically interrupted by projections on a wheel such as wheel 26 of FIG. 2. The intermittent light falling on such a photosensitive element will cause the generation of a pulsating current, the time interval between pulses again depending upon the rotational speed of wheel 26. The rotational speed of wheel 26 of course has a predetermined fixed relationship to the tangential speed of wheel 11.

Figure 3:
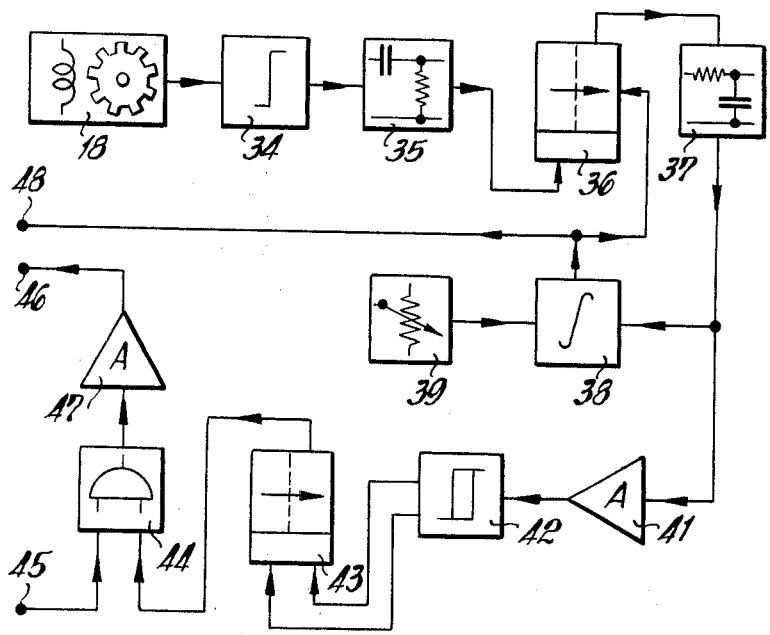
FIG. 3 shows a block diagram of one embodiment of the present invention.

The block diagram shown in FIG. 3 shows the signal generating means such as those shown in FIG. 2 in block 18. The output of signal generating means is connected to the input of a Schmitt trigger 34 whose output is connected with additional differentiating means 35. The output of differentiating means 35 is connected with an input of first multivibrator means, here a monostable multivibrator 36. Connected to the output of monostable multivibrator 36 are low pass filter means, here a low pass filter 37 whose output is connected with a feedback circuit having an integrating characteristic and denoted by reference numeral 38. A second input of integrating feedback circuit 38 is connected to a block 39 which denotes means for furnishing a reference signal to feedback means 38. The output of integrator means 38 is connected to a second input of monostable multivibrator 36. A signal applied to this second input causes variations in the time in which monostable multivibrator 36 is in the unstable state. Blocks 38 and 39 both are part of additional circuit means for furnishing a differentiated signal corresponding to the derivative with respect to time of the low pass filter output. The output of low pass filter 37 is further connected to the input of threshold means via an amplifier 41. The threshold means are denoted by reference numeral 42 and actually have two outputs, one connected to the set and another to the reset input of second multivibrator means, here a monostable multivibrator 43. The output of one side of the monostable multivibrator 43 is connected to one input of a coincidence stage 44. The second input of coincidence stage 44 is obtained from a terminal 45, the signal applied to which will be discussed below. The output of coincidence stage 44 is furnished via an amplifier 47 to terminal 46 and constitutes the desired output signal of this invention. A terminal 48 is connected to the output of integrating means 38.

The signal furnished at terminal 45 mentioned above is derived as follows: Reference is made to the circuit of FIG. 4 which shows an AND gate 51 having a plurality of inputs 48, 48', etc. The output of AND gate 51 is connected to the input of an amplifier 52 which may preferably be a Schmitt trigger circuit. The output of amplifier 52 is connected to a plurality of terminals 45, 45', etc.

Figure 5:
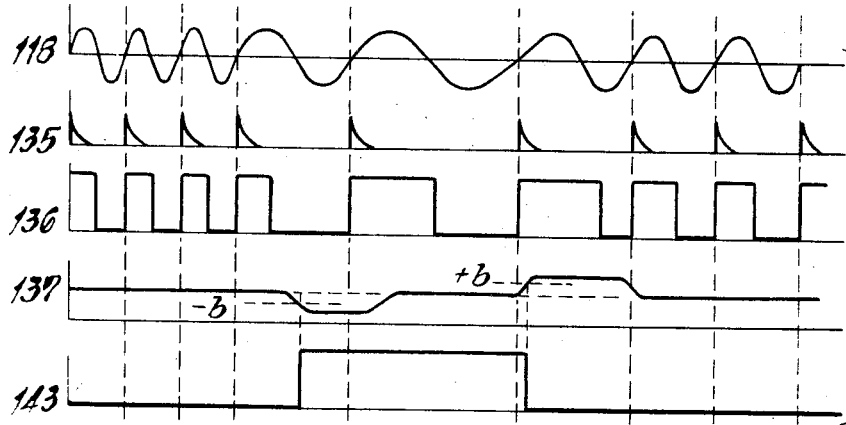
FIG. 5 shows a number of voltage-time curves at different points of the arrangement of FIG. 3.

The arrangement of this invention will now be discussed with relative to the block diagram shown in FIG. 3. The signal furnished by the signal generating means 26 and 28, which form a signal sequence wherein the time interval between sequential signals is inversely proportional to the rotational speed of wheel 11, are shaped and amplified in a conventional fashion, so that a sequence as shown in line 118 is furnished at the output of block 18. This is shown in FIG. 5. The wave form 118 is shaped into rectangular pulses by Schmitt trigger 34. These pulses are differentiated by the differentiating means 35. The output of the differentiating means 35 comprises a sequence of pulses having the shape shown in line 135 of FIG. 5. The pulses shown in line 135 trigger monostable multivibrator 36. The output of monostable multivibrator 36 is filtered by the low pass filter 37. The output of low pass filter 37 is a substantially steady signal corresponding to the time average value of the pulses shown in line 136 of FIG. 5, namely the output pulses of monostable multivibrator 36. Under condition of a moving vehicle to which no brakes are being applied, the output voltage of monostable multivibrator 36 (136) and the output of low pass filter 37 (137) are shown towards the left side in FIG. 5. The average value as depicted in line 137 is applied to the input of integrating means 38. A constant but adjustable reference voltage is applied to the other input of integrating means 38 via a reference source 39. The output of integrating means 38 is applied to monostable multivibrator 36 in such a manner that the time interval in which the multivibrator 36 is in the unstable state is adjusted in such a way that the on-off time of pulses in sequence 136 remains substantially constant. Thus under steady state conditions the time average 137 of pulse sequence 136 does not depend upon the rotational velocity of wheel 11. However, the more rapidly the frequency of the signal generated by signal generating means 118 changes, the further integrator 38 lags in main-taining the constant on-off ratio of monostable multivibrator 36 and thus the time average 137 of the output voltage of monostable multivibrator 36 tends to depart from the time average under steady state conditions. Thus for a rapid deceleration, the output voltage 137 of low pass filter 37 will begin to decrease.

This decrease in voltage is amplified in amplifier 41. If the wheel 11 is decelerated sufficiently, the decrease will exceed the predetermined or permissible value (minus $b$). In this case the lower threshold value of threshold means 42 has been passed. Thus threshold means 42 furnish an output signal which triggers multivibrator 43. This monostable multivibrator is adjusted to remain in the unstable state for a predetermined time, for example, 200 milliseconds. This output voltage is shown in line 143 of FIG. 5. It is applied to coincidence stage 144 and, via an amplifier 47, may be applied to a magnetic valve which is not shown in the Figure. This magnetic valve will then cause a decrease in pressure in the brake cylinder arrangement 15 causing the brakes to be lifted from wheel 11.

If no further deceleration of the wheel takes place at this point, the voltage 137 remains constant and monostable multivibrator 43 remains in the unstable state wherein a pulse is furnished to coincidence means 44. If the wheel is now accelerated due to reduction of sliding, output voltage 137 of low pass filter 37 again increases, thus causing the upper threshold of threshold means 42 (+$b$) to be crossed. The threshold means 42 then furnish a second output which switches multivibrator 43 back to its original state, thereby terminating the pulse applied to coincidence means 44. The threshold means 42 may for example comprise a first and second operational amplifier each constructed in such a manner that it switches for a different input level. Such operational amplifiers generally have a feedback resistance which furnishes a positive feedback. This causes the operational amplifier to switch when a predetermined voltage is applied at its input. Alternatively of course two Schmitt triggers might be used.

This termination of the pulse generated by monostable multivibrator 43 is shown clearly in line 143 of FIG. 5. The magnetic valve controlling the brake pressure is now reset to its original state via coincidence means 44 and amplifier 47 causing brake power to be reapplied. It is seen that threshold means 42 returns the monostable multivibrator 43 to its reset state prior to the time that it would normally have returned thereto.

However, if the sliding wheel 11 is not accelerated sufficiently in spite of the loosened brakes, as can happen on an icy street, then the distance between pulses furnished by monostable multivibrator 36 does not decrease as mentioned above and the output voltage 137 of low pass filter 37 does not increase sufficiently. Thus the upper threshold value of threshold means 42 (+$b$) is not reached. In this case the return of monostable multivibrator 43 to its reset state after its normal time period in the unstable state allows the brakes to be reapplied for at least a short time. When the vehicle is moving very slowly, the distance between successive signals generated by signal generating means 18 and formed into pulse sequence 135 remains very large and monostable multivibrator 36 is triggered only at relatively long time intervals. Therefore the output voltage 137 of low pass filter 37 oscillates. Because of these oscillations both the lower threshold value −$b$ and the upper threshold value +$b$ may be constantly passed even for constant speeds of the vehicle. This would cause monostable multivibrator 43 to be switched continually, therefore continually activating the magnetic valve which controls the brake power.

Figure 4:
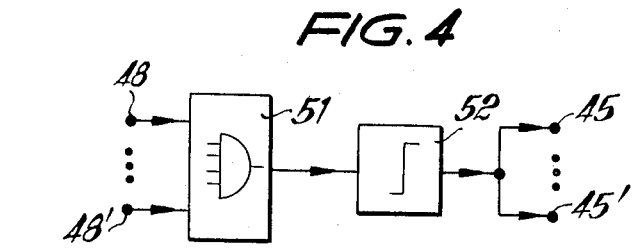
FIG. 4 is a block diagram of an arrangement for blocking the operation of the arrangement in accordance with FIG. 3 for low vehicle speeds.

In order to prevent such oscillatory applications of brake pressure, the circuit shown in FIG. 4 is used. This comprises an AND gate 51 which has a plurality of inputs 48, 48', etc. Voltages are applied to these inputs which correspond to the rotational velocity of the individual wheels. It should be noted that an arrangement as shown in FIG. 3 would in a preferred embodiment of the present invention be connected to each individual wheel of the vehicle. Thus a voltage corresponding to the speed of each wheel is applied, respectively, to inputs 48. In the embodiment shown in FIG. 3 these voltages may be derived from terminal 48. If now the speed of all wheels is less than the speed corresponding to the lower threshold value −$b$ (as may occur at vehicle speeds of approximately 5 miles per hour), then the conditions for AND gate 51 are met and AND gate 51 furnishes an output signal which causes Schmitt trigger 52 to change state. It should be noted here that only one AND gate 51 and one Schmitt trigger 52 is required for each vehicle while, as mentioned above the signal generating means and the logic circuit means are supplied for each wheel. The output voltage of amplifier 52 is now applied to each coincidence stage of each wheel via terminals 45, 45' etc. An output signal of AND gate 51 causes the coincidence requirements for coincidence stage 44 to be unfulfilled and it therefore becomes impossible for logic circuit means 19 to be operative in controlling the brakes. This is because the magnetic valve which is not shown in the drawing cannot be switched because no output is supplied at terminal 46.

The time constants associated with the circuits of the logic circuit means are made relatively high in order to prevent oscillatory behavior in the valves associated with the brake cylinder arrangement 15. Thus the logic circuit means will also not respond to small decelerations which may result from an unevenness of the surface on which the vehicle is rolling.

Figure 8:
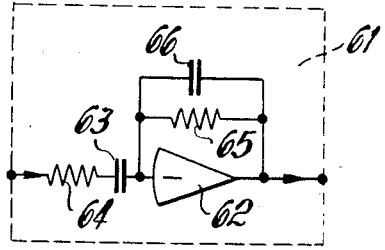
FIG. 8 shows a differentiating stage for use in an arrangement according to FIG. 6.
Figure 6:
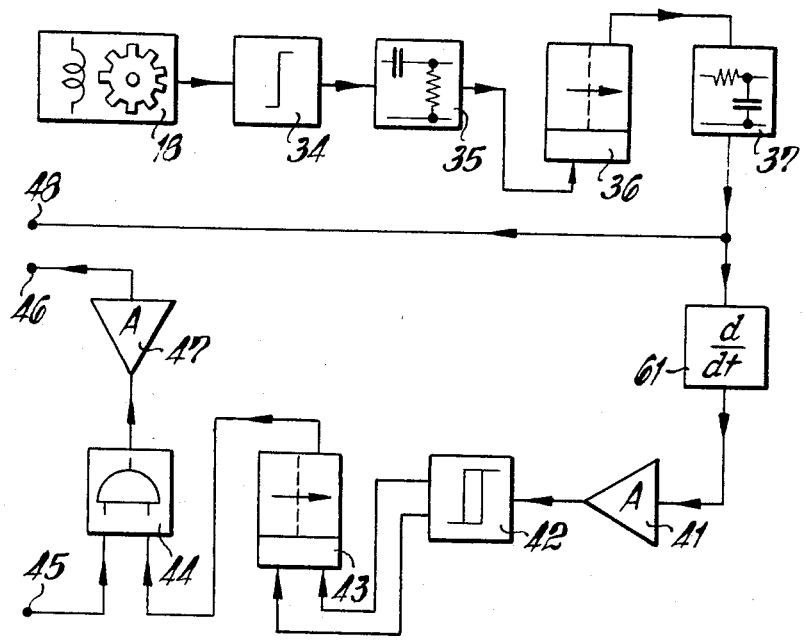
FIG. 6 is a block diagram of another embodiment of the present invention.
Figure 7:
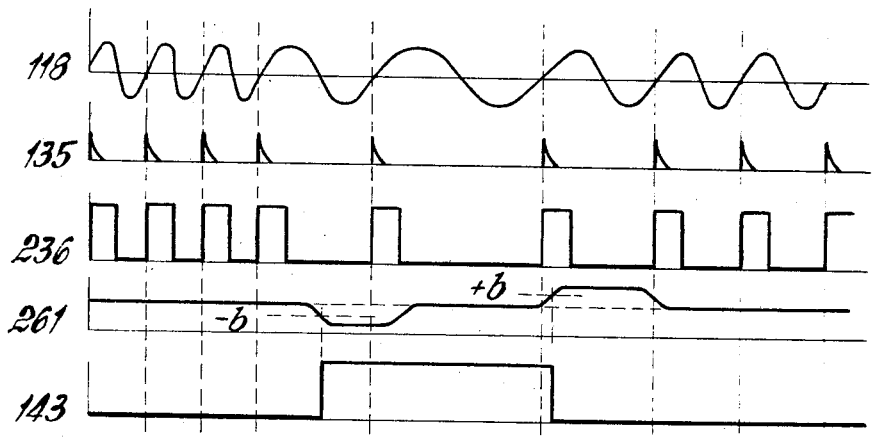
FIG. 7 shows a number of voltage-time curves at selected points in the arrangement of FIG. 6.

FIG. 6 shows another advantageous variation of the present invention. Differentiating means 61 are connected to the output of low pass filter 37. The output of differentiating means 61 is in turn connected to the input of an amplifier 41. Output terminal 48 is also connected with the output of low pass filter 37. FIG. 7 shows the variations of voltage with respect to time at several points of the circuit shown in FIG. 6. FIG. 8 shows schematically, the differentiating stage shown in FIG. 6. FIG. 8 shows a conventional operational amplifier 62 which has an input capacitance 63 and a feedback resistor 65. Connected in series with the input capacitor 63 is a resistance 64 which is a limiting resistance, and connected in parallel with feedback resistor 65 is a filter capacitance 66. The output of operational amplifier 62 constitutes the output of the differentiating stage 61. In a conventional operational amplifier such as amplifier 62, there is a second, non-inverting input. This input is supplied with a D.C. voltage which, determines the D.C. level of the output of stage 61.

Low pass filter 37 as shown in FIG. 6, furnishes the time average of the pulse sequence 236 (FIG. 7) which is available at the output of monostable multivibrator 36. This time average value is applied to the input of differentiating stage 61. Stage 61 is an operational amplifier constructed as described above. It should only be noted in addition that the limiting resistor 64 in its input causes voltage spikes due to noise which may appear at the input of the circuit of FIG. 8 to be substantially suppressed. Filter capacitor 66 causes a damping of high frequency noise voltages. The resistor 64 and the filter condenser 66 must have values relative to elements 63 and 65 that the circuit still acts as a true differentiator within the frequency region which is required for the operation of the present invention. The output voltage of the differentiating stage 61 is shown in the line labelled 261 in FIG. 7. The circuit of FIG. 6 operates in exact correspondence to that shown in FIG. 3 and described in detail above.

It should be noted that the above description has shown several embodiments wherein brakes are applied or removed in accordance with the operation required to prevent skidding of the vehicle. It is of course also possible that the arrangements set forth herein affect the driving force applied to the wheels rather than the braking force applied thereto. If it is desired to affect the driving force rather than the braking force, the output signal furnished by the present arrangement is applied to the clutch between the motor and the driving axle. The operation is in other respects completely identical to that described above.

It should be noted that an arrangement according to the present invention has a number of advantages: First, the signal generating means are not subject to wear and therefore very high reliability throughout the whole life of the arrangement is guaranteed. Further, the arrangement operates practically without time delay so that it may control either the braking or the driving force immediately when a wheel begins to slide. Furthermore, the fact that the arrangement operates generally in a digital fashion, also insures a relatively great immunity against noise voltages. Further, the arrangement in accordance with this invention takes consideration of the fact that an increase in the mass of the vehicle due to increased loading allows a greater brake or driving power to be applied to the wheels without causing sliding of said wheels. Further, the arrangement in accordance with this invention will operate independent of the fact that the vehicle is either on a dry street or on an icy path. For vehicle velocities of less than a predetermined value the present arrangement does not respond at all since such operation is not required at such low speeds.

Without further analysis, tee foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An arrangement for furnishing an output signal upon skidding of a wheel of a motor vehicle, comprising, in combination, a plurality of signal generating means, each operatively associated with the wheel of said motor vehicle, each of said signal generating means furnishing a signal sequence wherein the time interval between sequential signals corresponds to the rotational velocity of said wheel; and logic circuit means each operatively associated with one of said signal generating means for furnishing said output signal when the change in said time interval exceeds a predetermined change depending upon the rotational velocity of said wheel, each of said logic circuit means comprising first monostable multivibrator means, low pass filter means connected to the output of said monostable multivibrator means, additional circuit means for furnishing a differentiated signal corresponding to the derivative with respect to time of the output of said low pass filter means in the absence of said additional circuit means, threshold means connected to receive said differentiated signal, and furnishing a threshold signal when said differentiated signal differs by more than a predetermined difference from a predetermined level, and second monostable multivibrator means connected to the output of said threshold means.

2. An arrangement as set forth in claim 1, wherein said threshold means furnishes a first threshold signal at a first threshold output when said differentiated signal is lower than said predetermined level by a predetermined difference, and a second threshold signal at a second threshold output when said differentiated signal is higher than said predetermined level by a predetermined difference; and wherein said second monostable multivibrator has a first input connected to said first threshold output and a second input connected to said second threshold output and a second monostable output.

3. An arrangement as set forth in claim 1, further comprising coincidence means having a first and second coincidence input and a coincidence output; means connecting said second monostable output to said first coincidence input; and wherein the output of said coincidence means constitutes said output signal.

4. An arrangement as set forth in claim 3, further comprising means for furnishing a plurality of voltages, each corresponding to the speed of one of said wheels of said vehicle; and AND gate means having a number of inputs corresponding to said plurality of voltages, each of said inputs being connected to receive one of said voltages, said AND gate means further having an AND gate output.

5. An arrangement as set forth in claim 4, wherein said means for furnishing a plurality of voltages, each corresponding to the speed of one wheel, comprise a plurality of interconnecting means, each interconnecting the output of one of said low pass filter means to a corresponding AND gate input.

6. An arrangement as set forth in claim 4, wherein said signal generating means and said logic circuit means each comprise a plurality of means, each of said plurality of means being operatively associated with one of said wheels of said motor vehicle; further comprising interconnecting means interconnecting said AND gate output with the second coincidence input of each of said plurality of means.

7. An arrangement as set forth in claim 6, wherein said interconnecting means comprise a Schmitt trigger connected with said AND gate output.

8. An arrangement as set forth in claim 6, further comprising a Schmitt trigger circuit connected to the output of each of said signal generators.

9. An arrangement as set forth in claim 8 further comprising additional differentiating means, each connected to the output of one of said Schmitt trigger circuits.

10. An arrangement as set forth in claim 9, wherein said first monostable multivibrator has a first input for switching said monostable multivibrator to the unstable stage and a second input for a adjusting the time interval said first monostable multivibrator is in said unstable state; wherein said additional circuit means comprise integrator means connected between the output of said low pass filter means and said second input of said first monostable multivibrator; and wherein said means for furnishing a plurality of voltages, each corresponding to the speed of one wheel, comprise connecting means connecting the output of said integrator means to a corresponding one of said AND gate inputs.

11. An arrangement as set forth in claim 1, wherein said additional circuit means comprise a differentiating circuit connected to the output of said low pass filter means.

12. An arrangement as set forth in claim 11, wherein said differentiating circuit comprises an operational amplifier having a feedback resistor and an input capacitor.

13. An arrangement as set forth in claim 12, further comprising a damping resistor connected in series with said input capacitor.

14. An arrangement as set forth in claim 12, further comprising a filter capacitor connected in parallel with said feedback resistor.

15. An arrangement as set forth in claim 12, further comprising differential amplifier means connected to the output of said differentiating circuit.

16. An arrangement as set forth in claim 1, wherein each of said signal generating means comprise a magnetic wheel having projections, mechanically coupled to the corresponding wheel of said motor vehicle, and sensing means for sensing said projection mechanically connected with the chassis of said motor vehicle.

17. An arrangement as set forth in claim 1, wherein said threshold means comprise an operational amplifier.

18. An arrangement as set forth in claim 1, wherein said threshold means comprise a Schmitt trigger.

19. An arrangement for furnishing an output signal upon skidding of a wheel of a motor vehicle, comprising, in combination, signal generating means operatively associated with a wheel of said motor vehicle, each of said signal generating means furnishing a signal sequence wherein the time interval between sequential signals corresponds to the rotational velocity of said wheel; and logic circuit means operatively associated with said signal generating means for furnishing said output signal when the change in said time interval exceeds a predetermined change depending upon the rotational velocity of said wheel, said logic circuit means comprising: first monostable multivibrator means having a first and second input and an output, a signal at said first input switching said first monostable multivibrator means into the unstable state, said first monostable multivibrator means remaining in said unstable state for a time depending upon the signal at said second input; low pass filter means connected to the output of said first monostable multivibrator means; and integrator means connected between the output of said low pass filter means and said second input of said first monostable multivibrator means, a signal having an amplitude exceeding a predetermined amplitude at the output of said low pass filter means constituting said output signal.

\* \* \* \* \*